Oct. 5, 1926.
J. DEWITT
1,601,722
COMBINED VEHICLE DIRECTION INDICATOR AND TAIL LIGHT
Filed Jan. 13, 1925
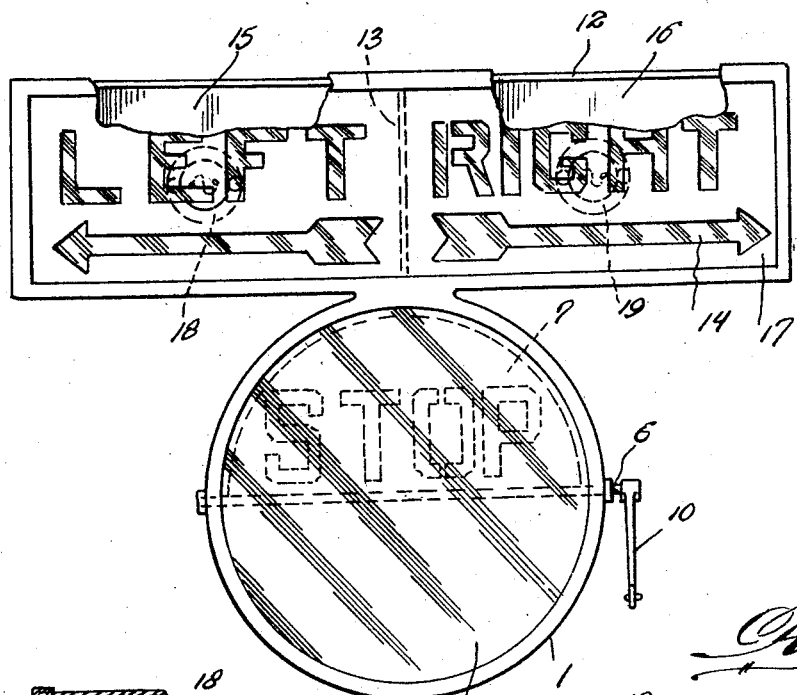
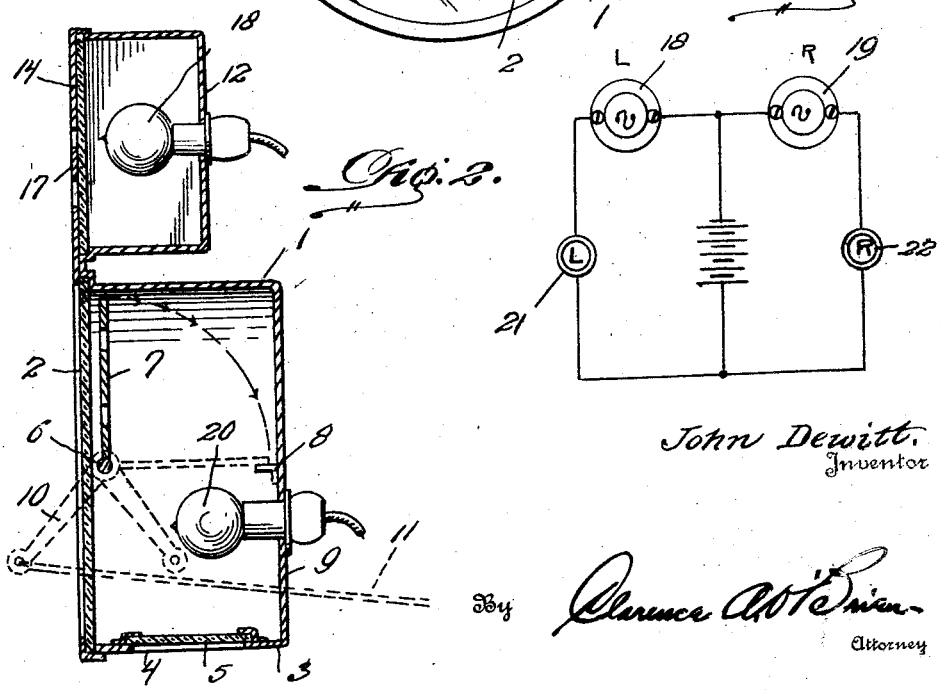
John Dewitt,
Inventor Patented Oct. 5, 1926.

1,601,722

UNITED STATES PATENT OFFICE.

JOHN DEWITT, OF NEWARK, OHIO.

COMBINED VEHICLE DIRECTION INDICATOR AND TAIL LIGHT.

Application filed January 13, 1925. Serial No. 2,176.

This invention relates to new and useful improvements in vehicle direction indicators and has for its principal object to provide a simple and efficient device which will warn the vehicle in the rear of the direction the vehicle upon which the signal is mounted is about to pursue.

A further object of the invention is to provide a combined vehicle direction indicator and tail light of the above mentioned character, which is of such a construction as to provide a stop signal, the latter being automatically brought into an operative position upon the actuation of the foot brake.

A still further object of the invention is to provide a device of the above mentioned character wherein the license plate may be illuminated, the device being further adapted for use as a parking light as well as a direction indicator.

A further object of the invention is to provide a device of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same, Figure 1 is a front elevation of my improved device, Figure 2 is a central vertical section taken therethrough, and Figure 3 is a view showing the wiring diagram.

In the drawing wherein for the purpose of illustration is shown the preferred embodiment of my invention, the numeral 1 designates a substantially circular casing which has its front face open and in which is adapted to be supported the transparent glass 2. The bottom 3 of the casing 1 is also provided with an opening 4 and over which extends the transparent glass 5, the same being supported thereon in any suitable manner. The purpose of the last mentioned opening and the transparent covering therefor is to provide a means for illuminating the license plate which may be supported in any well known manner directly below the casing. It is of course to be understood that the casing 1 is supported on the vehicle in such a manner as to permit the same to be used in conjunction with illuminating the license plate and as well as providing a tail light or parking light.

Extending transversely through the central portion of the casing 1 adjacent the front face thereof is a rod or shaft 6. Carried by the shaft 6 is the substantially semicircular shaped signal plate 7 which is formed of any suitable metal and has stamped therein the word "Stop." Cooperating with the signal plate 7 is the flange 8 which is supported on the inner face of the rear wall 9 of the casing 1 in the manner clearly shown in Figure 2 of the drawing, and the purpose of this arrangement is to provide a means for supporting the signal plate 7 when the latter is in an inoperative position as is shown in the dotted lines in Figure 2. The outer end of the shaft 6 has secured thereto a suitable lever 10 and the latter is connected to the foot brake of the vehicle by means of the cable 11 so as to be actuated thereby and so as to further cause the actuation of the signal member 7. The operation of this device however will be more fully described later.

Formed integrally with the casing 1 and extending above the top thereof is an auxiliary casing or an additional casing 12, the outer ends of which extend beyond the sides of the casing 1 in the manner clearly shown in Figure 1 of the drawing. The casing 12 has its central portion provided with a vertical partition 13 and the front face of the additional casing is also open and a transparent glass 14 extends across the entire length of the casing in the front face. The partition 13 forms a pair of compartments 15 and 16 respectively to provide independent housings for use in connection with the circular plate 17 which extends across the entire front face of the additional casing 12 and has its marginal edges bent over into engagement with the edges of the casing 12 in the manner clearly illustrated in the drawing. The signal plate 17 which is also formed of metal has stamped therein the words "Left" and "Right" respectively, the indicia being formed on the plate 17 in such a manner as to have the word "Left" disposed over the front face of the compartment 15, and the word "Right" over the front face of the compartment 16 in the manner clearly illustrated in Figure 1 of the drawing. If desirable, arrows may also be formed directly below each of the words to further indicate the proper direction. Extending through the rear of the compartments 15 and 16 are the electric bulbs 18 and 19 respectively, the same being connected to the source of electric supply which may be the battery in the usual manner. A similar electric bulb 20 extends through the rear wall of the casing 1 and also connected to the battery in the usual manner. The electric light 20 in the casing 1 is normally in circuit with the headlights of the vehicle so that when the latter are turned on in the night time the tail light 20 will also be illuminated. For the purpose of illuminating the lights 18 and 19 independently when the operator is desirous of making a turn in either a left hand or right hand direction, I provide the switches 21 and 22 respectively which are preferably placed on the dash board of the vehicle and within easy access to the driver so that if the driver desires to make a left hand turn, he may turn on the switch 21 and cause the light 18 in the compartment 15 to illuminate the casing and cause the word "Left" to be readily visible for a suitable distance in the rear of the vehicle thus warn the vehicles in the rear of the course of travel of the vehicle upon which the signal is mounted is to pursue. In the same manner if the operator is to make a right hand turn, the switch 22 is actuated so as to illuminate the compartment 16 by means of the electric bulb 19.

As heretofore stated the signal member 7 is normally in the position as shown in the dotted lines of Figure 2 of the drawing and will be maintained in this position as long as the vehicle foot brake is not actuated. When the operator of the vehicle desires to stop the same, the actuation of the foot brake will simultaneously cause a forward movement of the lever 10 and the same being connected to the shaft 6 will rotate the same to swing the signal plate 7 upwardly in the central portion of the casing 1 so that the plate 7 will extend substantially parallel and adjacent the transparent glass 2 in the casing 1 and the bulb 20 will illuminate the casing so that the stop signal will be readily visible at night. When foot brake is released, the lever 10 and signal plate 7 will return to the normal position so that the signal member 7 will be rendered inoperative.

It will thus be seen from the foregoing description, that a combined vehicle direction indicator and tail light has been provided which is very simple in construction, inexpensive, strong and durable and the parts so arranged as to be readily operable without inconveniencing the driver of the vehicle and assuring the display of the proper signal so as to prevent the vehicles in the rear from misconstruing the direction the vehicle carrying the signal is supported is to pursue.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

A combined vehicle direction indicator and tail light comprising a casing, the front face thereof being open, transparent glass supported therein, the bottom of the casing being provided with an opening, a transparent covering therefor, a shaft extending transversely through the central portion of the casing adjacent the front face thereof, a substantially semi-circular plate carried by the shaft, said plate having signalling indicia formed therein, a flange secured on the rear wall of the casing and upon which the free edge portion of the signal plate is adapted to rest when in its normally inoperative position, a lever carried by the outer end of said shaft and adapted to be actuated to swing the signal plate upwardly in the casing to an operative position so that the plate is disposed adjacent the transparent glass in parallel relation thereto, and a source of light supported in the casing, the signalling indicia formed in said plate being readily visible when the plate is in its operative position.

In testimony whereof I affix my signature.

JOHN DEWITT.